(12) United States Patent
Xu et al.

(10) Patent No.: US 12,425,100 B2
(45) Date of Patent: Sep. 23, 2025

(54) OPTICAL FIBER DETECTION METHOD, CONTROL MODULE AND COMPUTER MEDIUM OF DISTRIBUTED ANTENNA SYSTEM

(71) Applicants: PROSE TECHNOLOGIES (SUZHOU) CO., LTD., Suzhou (CN); PROSE TECHNOLOGIES LLC, Mount Olive, NJ (US)

(72) Inventors: Renzhen Xu, Suzhou (CN); Botao Zhu, Suzhou (CN); Cunxiao Fan, Suzhou (CN); Xiuping Wang, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 258 days.

(21) Appl. No.: 18/350,343

(22) Filed: Jul. 11, 2023

(65) Prior Publication Data
US 2024/0031021 A1 Jan. 25, 2024

Related U.S. Application Data

(63) Continuation of application No. PCT/CN2022/076748, filed on Feb. 18, 2022.

(30) Foreign Application Priority Data

Nov. 23, 2021 (CN) .......................... 202111395869.7

(51) Int. Cl.
*H04B 10/073* (2013.01)
*H04B 10/032* (2013.01)

(52) U.S. Cl.
CPC ......... *H04B 10/073* (2013.01); *H04B 10/032* (2013.01)

(58) Field of Classification Search
CPC .................... H04B 10/07–0799; H04B 10/032
See application file for complete search history.

(56) References Cited

U.S. PATENT DOCUMENTS

| 11,108,489 | B1 * | 8/2021 | Archambault ....... H04B 10/073 |
| 2020/0213880 | A1 | 7/2020 | De Goycoechea | |
| 2021/0211192 | A1 * | 7/2021 | Funada ................... H04L 69/40 |

FOREIGN PATENT DOCUMENTS

| CN | 102394698 A | 3/2012 |
| CN | 103023561 A | 4/2013 |

(Continued)

OTHER PUBLICATIONS

World Intellectual Property Organization (WIPO) International Search Report for PCT/CN2022/076748 Aug. 19, 2022 6 pages (with translation).

*Primary Examiner* — Casey L Kretzer
(74) *Attorney, Agent, or Firm* — ANOVA LAW GROUP, PLLC

(57) ABSTRACT

An optic fiber detection method of a distributed antenna system includes: at a near-end device, sending a test mode switch command to a plurality of relay devices to command the plurality of relay devices to switch to a test mode; and under the test mode: sending a first optical switch control command, the first optical switch control command being used to instruct the plurality of relay devices that have received the first optical switch control command to switch to a group of first optical channels; acquiring optic fiber connection information between the near-end device and the relay devices under all first optical channels of the group of first optical channels; and determining optic fiber connection status of the distributed antenna system according to the (Continued)

optic fiber connection information between the near-end device and the relay devices under all first optical channels and a working mode of the distributed antenna system.

19 Claims, 11 Drawing Sheets

(56) References Cited

FOREIGN PATENT DOCUMENTS

| | | | |
|---|---|---|---|
| CN | 103795573 | A | 5/2014 |
| CN | 106792796 | A | 5/2017 |
| CN | 107493135 | A | 12/2017 |
| CN | 109698871 | A | 4/2019 |

* cited by examiner

OPTICAL FIBER DETECTION METHOD, CONTROL MODULE AND COMPUTER MEDIUM OF DISTRIBUTED ANTENNA SYSTEM

RELATED APPLICATIONS

This application is a continuation application of PCT Patent Application No. PCT/CN2022/076748, filed on Feb. 18, 2022, which claims priority to Chinese Patent Application No. 202111395869.7 filed with the National Intellectual Property Administration, People's Republic of China on Nov. 23, 3021, all of which are incorporated herein by reference in entirety.

FIELD OF THE TECHNOLOGY

The present disclosure generally relates to the field of communication, and more specifically, relates to an optical fiber detection method, an optic fiber detection apparatus, a control module, and a computer-readable storage medium, in relation to a distributed antenna system.

BACKGROUND

In many scenarios, such as in buildings, tunnels, large public places, stadiums and the like, the base station may not provide a large enough signal coverage, or the user density exceeds the range that the base station may usually handle. In these scenarios, the base station's signal coverage for these areas may be expanded or enhanced by installing a Distributed Antenna System (DAS). In particular, with the popularization of the fifth-generation mobile communication technology (5G), the millimeter wave (mmWave) of 5G has low penetration in space transmission and is susceptible to interference, so the demand for the deployment of distributed antenna systems has further been increased.

A distributed antenna system usually includes multiple space-separated antenna nodes or components, which transmit the signal from a signal source to a far-end end step by step through various signal transmission media. FIG. 1 shows a schematic structural diagram of a distributed antenna system 100. As shown in FIG. 1, the distributed antenna system 100 has a multi-level architecture, which may include a near-end device 10 and multiple relay devices 20 (shown schematically as relay devices 20-1, 20-2, . . . 20-m, wherein m is an integer greater than 1) and a plurality of far-end devices 30 (shown schematically as far-end devices 30-1, 30-2, . . . 30-n in FIG. 1, where n is an integer greater than 1, and n is greater than or equal to m). The near-end device 10 may acquire a radio frequency signal from a signal source such as a base station, and transmit the acquired radio frequency signal to the far-end device 30 through the relay device 20. The far-end device 30 is at a place where signal coverage needs to be expanded or enhanced, to directly communicate with the user's mobile terminal.

The near-end device 10 may be connected to the relay device 20 through an optical fiber, and the relay device 20 may be connected to the far-end device 30 through an optical fiber. Therefore, fiber damage will cause communication interruption and abnormal radio frequency signals. Since the near-end device 10, the relay device 20, and the far-end device 30 are usually located at different physical locations or difficult-to-reach locations, it is very difficult and time-consuming to manually detect the entire optical fiber link, and it is impossible to pinpoint and correct connection errors when there is a connection error in the optical fiber.

SUMMARY

To solve the problem that it is difficult for the distributed antenna system to perform optical fiber detection, the present disclosure provides an optical fiber detection method for distributed antennas, where the upper-level device may detect the optical fiber connection information between itself and the connected lower-level device, and determine whether the optical fiber connection status is normal according to a predetermined fiber connection relationship under a corresponding working mode.

In one aspect, the present disclosure provides an optic fiber detection method of a distributed antenna system, where the distributed antenna system includes a near-end device, a plurality of relay devices, and a plurality of far-end device, the near-end device is connected to the plurality of relay devices through multiple groups of first optic channels, each of the relay devices is connected to the plurality of far-end devices through multiple groups of second optical channels, and the optical fiber detection method includes: at the near-end device, sending a test mode switch command to a plurality of relay devices to command the plurality of relay devices to switch to a test mode; and under the test mode: sending a first optical switch control command, the first optical switch control command being used to instruct the plurality of relay devices that have received the first optical switch control command to switch to a group of first optical channels; acquiring optic fiber connection information between the near-end device and the relay device under all first optical channels of the group of first optical channels; and determining optic fiber connection status of the distributed antenna system according to the optic fiber connection information between the near-end device and the relay device under all first optical channels and a working mode of the distributed antenna system.

In another aspect, the present disclosure provides an optic fiber detection apparatus, including: at least one processor; and at least one memory coupled to the at least one processor and storing instructions for execution by the at least one processor that, when executed by the at least one processor, cause the at least one processor to perform steps of the above-mentioned method.

In yet another aspect, the present disclosure provides a non-transitory computer-readable storage medium on which computer program code is stored, and the computer program code executes the above-mentioned method when executed by a processor. Using the solution of the present disclosure, it is possible to automatically determine the optical fiber connection information between the upper and lower-level devices of the distributed antenna system, and it is possible to determine whether the optical fiber connection status is normal according to the optical fiber connection information and a predetermined fiber connection relationship under a corresponding working mode.

BRIEF DESCRIPTION OF THE DRAWINGS

Through a description of specific embodiments of the present disclosure in view of the following drawings, the present disclosure will be better understood, and other objects, details, features and advantages of the present disclosure will become more apparent.

DETAILED DESCRIPTION

Figure 1:
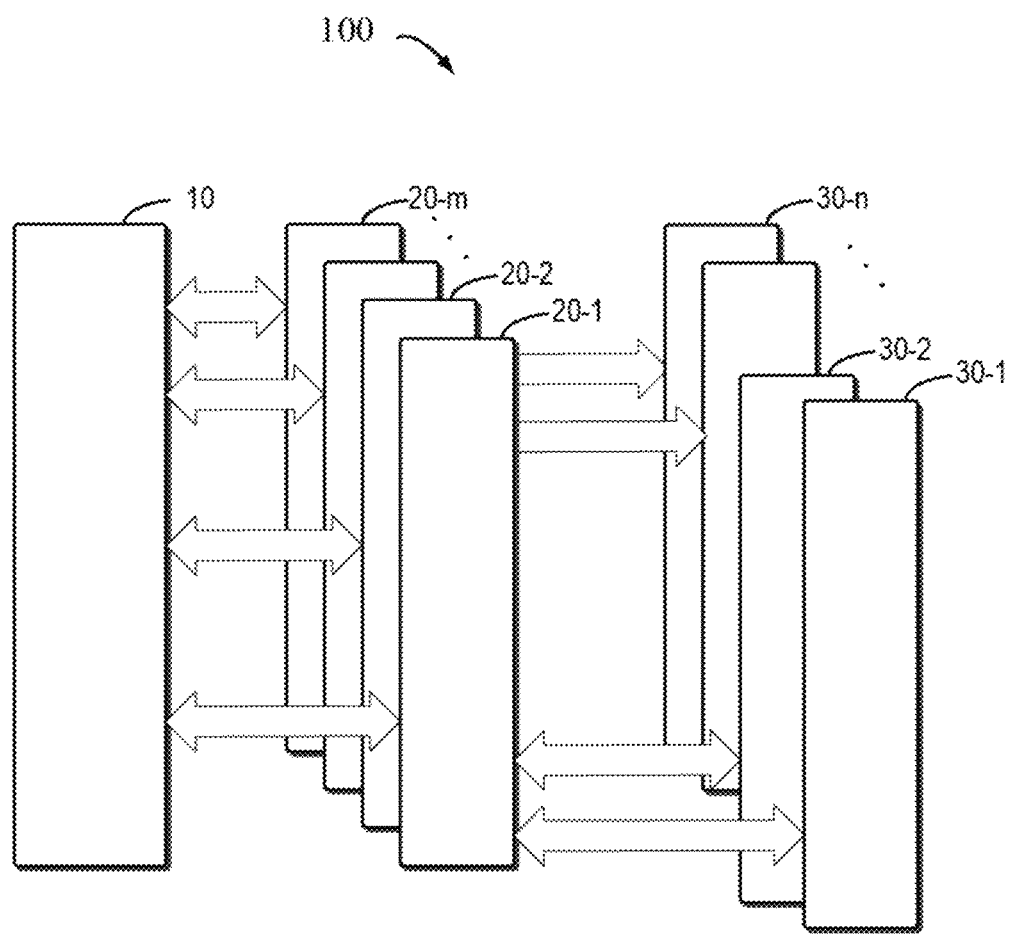
FIG. 1 shows a schematic structural diagram of a distributed antenna system.

Certain embodiments of the present disclosure will be described in more detail below with reference to the accompanying drawings. Although certain embodiments of the present disclosure are shown in the drawings, it should be understood that the present disclosure may be embodied in various forms and should not be limited to the embodiments set forth herein. Rather, these embodiments are provided so that the present disclosure will be thorough and complete, and will fully convey the scope of the present disclosure to those skilled in the art.

The term "comprising" and its variants used in the present disclosure represent an open inclusion, for example, "including but not limited to". The term "or" means "and/or" unless otherwise stated. The term "based on" means "based at least in part on". The terms "one embodiment" and "certain embodiments" mean "at least one example embodiment." The term "another embodiment" means "at least one further embodiment". The terms "first", "second", and the like may refer to different or the same object.

As shown in FIG. 1, the distributed antenna system 100 may include one near-end device 10, multiple relay devices 20 and multiple far-end devices 30. The near-end device 10 may include a first number of first optical modules 110, and each first optical module 110 has a second number of first optical ports 120. For example, four first optical modules 110-A, 110-B, 110-C, and 110-D are exemplarily shown in FIGS. 2 to 4 for the near-end device 10, and for each first optical module 110 eight first optical ports 120 are exemplarily shown, that is, the first optical module 110-A includes eight first optical ports 120-1 to 120-8, and the first optical module 110-B includes eight first optical ports 120-9 to 120-16, the first optical module 110-C includes 8 first optical ports 120-17 to 120-24, and the first optical module 110-D includes 8 first optical ports 120-25 to 120-32.

In addition, each relay device 20 may include a third number of second optical modules 210, and each second optical module 210 has a second optical port 220. A first optical port 120 of each first optical module 110 of the near-end device 10 may be connected to the second optical port 220 of a second optical module 210 of the relay device 20 through an optical fiber. For example, FIG. 2 and FIG. 4 exemplarily show four second optical modules 210-A, 210-B, 210-C, and 210-D for the relay device 20, and for each second optical module 210, one second optical port 220 is exemplarily shown, that is, the second optical port 220-A of the second optical module 210-A, the second optical port 220-B of the second optical module 210-B, the second optical port 220-C of the second optical module 210-C, and the second optical port 220-D of the second optical module 210-D; FIG. 3 exemplarily shows two second optical modules 210-A and 210-B for the relay device 20, and one second optical port 220 is exemplarily shown for each second optical module 210, that is, the second optical port 220-A of the second optical module 210-A, and the second optical port 220-B of the module 210-B. In this scenario, a connection between the first optical port 120 of the near-end device 10 and the second optical port 220 of the relay device 20 may also be directly described as a connection between the first optical port 120 of the near-end device 10 and the second optical module 210 of the relay device 20.

In addition, each relay device 20 may also include a fourth number of third optical modules 230, and each third optical module 230 has a fifth number of third optical ports 240. For example, four third optical modules 230-K, 230-L, 230-M and 230-N are exemplarily shown for the relay device 20 in FIG. 2 to FIG. 4, and for each third optical module 230 eight third optical ports 240 are exemplarily shown, that is, the third optical module 230-K includes eight third optical ports 240-1 to 240-8, and the third optical module 230-L includes eight third optical ports 240-9 to 240-16, the third optical module 230-M includes 8 third optical ports 240-17 to 240-24, and the third optical module 230-N includes 8 third optical ports 240-25 to 240-32. Each second optical module 210 of the relay device 20 may be connected to a third optical module 230 in various ways, to input the output signal of the second optical module 210 to the third optical module 230, which will not be elaborated herein.

Each far-end device 30 may include a sixth number of fourth optical modules 310, and each fourth optical module 310 may have a fourth optical port 320. A third optical port 240 of a third optical module 230 of each relay device 20 may be connected to a fourth optical port 320 of a fourth optical module 310 of a far-end device 30 through an optical fiber. For example, four fourth optical modules 310-K, 310-L, 310-M, and 310-N are exemplarily shown for each far-end device 30 in FIG. 2 to FIG. 4, and one fourth optical port 320 is exemplarily shown for each fourth optical module 310, that is, the fourth optical port 320-K of the fourth optical module 310-K, the fourth optical port 320-L of the fourth optical module 310-L, the fourth The fourth optical port 320-M of the four optical module 310-M, and the fourth optical port 320-N of the fourth optical module 310-N. In this scenario, in the following description, the connection between the third optical port 240 of the relay device 20 and the fourth optical port 320 of the far-end device 30 may also be directly described as the connection between the third optical port 240 of the relay device 20 and the fourth optical module 310 of the far-end device 30.

Depending on the number of first optical modules included in the near-end device 10, the number of first optical ports included in each first optical module, the number of second optical modules and the number of third optical modules included in the relay device 20, the number of third optical ports included in each third optical module, and the number of fourth optical modules included in each far-end device 30 and the like, the distributed antenna system 100 may have various structures.

In addition, the distributed antenna system 100 may work in multiple working modes. In different working modes, different corresponding relationships (that is, connection relationships) are pre-configured for the first optical port of the first optical module of the near-end device 10 and the second optical port of the second optical module of the relay device 20. In addition, in different working modes, different corresponding relationships (that is, connection relationships) are pre-configured for the third optical port of the third optical module of the relay device 20 and the fourth optical port of the fourth optical module of the far-end device 30. In the present disclosure, the corresponding optical ports of the upper and lower devices are connected in a one-to-one manner through optical fibers.

Figure 2:
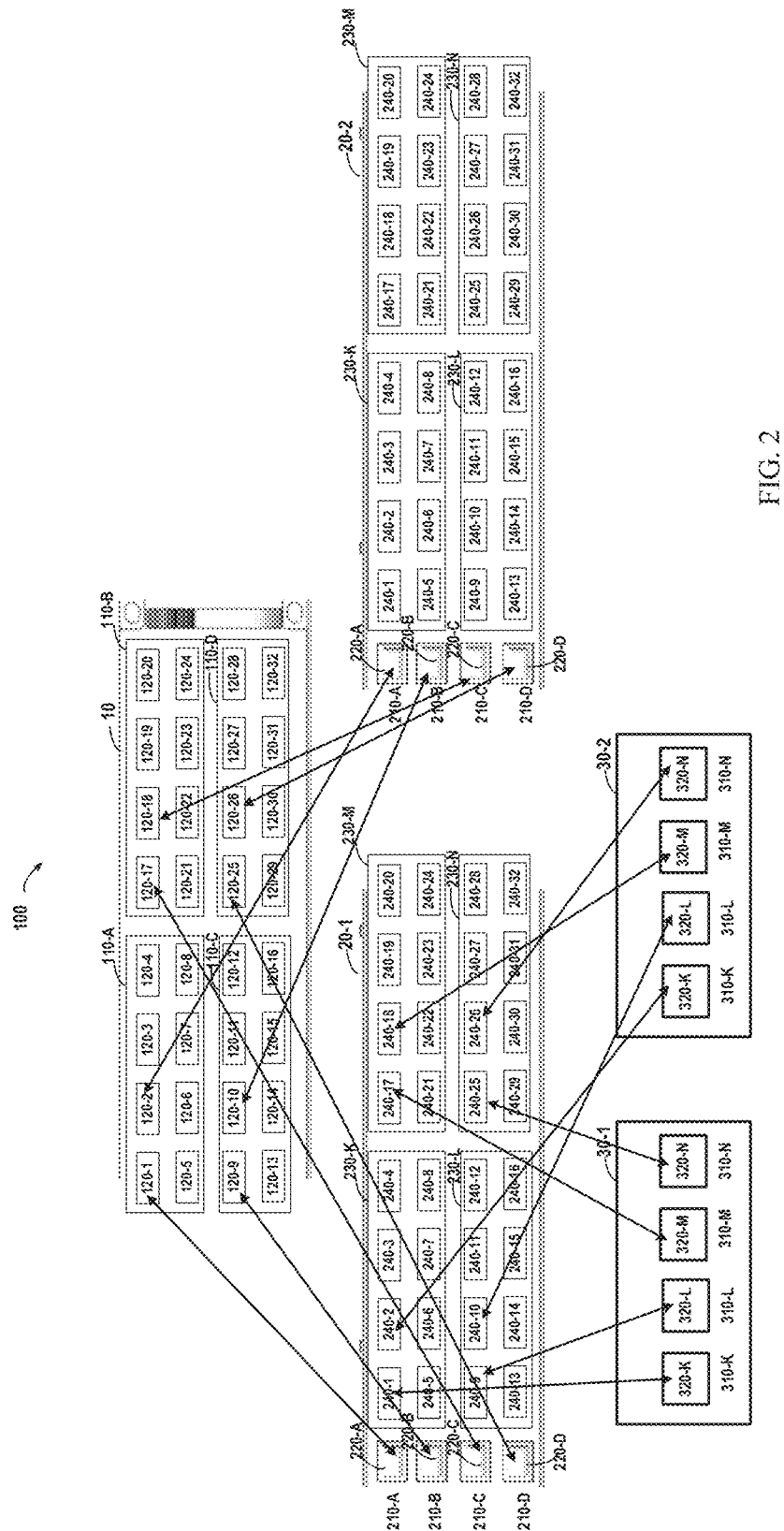
FIG. 2 shows a schematic diagram of the structure and connection relationship of a distributed antenna system in a working mode according to certain embodiments of the present disclosure.
Figure 3:
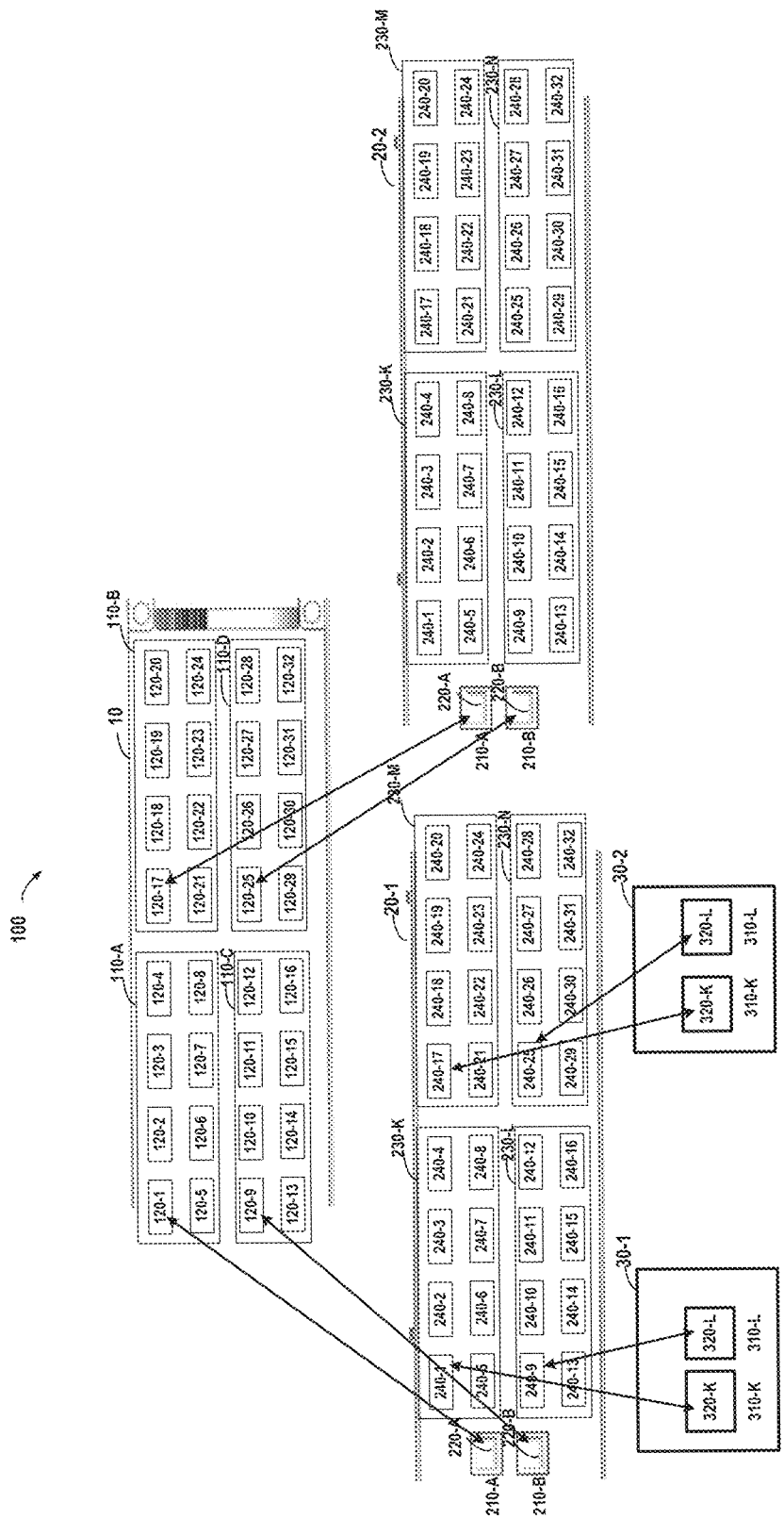
FIG. 3 shows a schematic diagram of the structure and connection relationship of a distributed antenna system in another working mode according to certain embodiments of the present disclosure.

FIG. 2 shows a schematic diagram of the structure and connection relationship of the distributed antenna system 100 in a working mode according to certain embodiments of the present disclosure. The working mode shown in FIG. 2 is 4T4R (that is, 4 transmissions and 4 receptions) mode, that is, the upper and lower-level devices of the distributed antenna system 100 are respectively connected by 4 optical fibers to form 4 physical optical fiber links.

As shown in FIG. 2, suppose the connection relationship between the first optical port 120 of the first optical module 110 of the near-end device 10 and the second optical port 220 of the second optical module 210 of the relay device 20 (for example, the relay device 20-1) is presumably shown in Table 1 below.

TABLE 1

| first optical port 120 | second optical port 220 of the relay device 20-1 |
|---|---|
| 120-1 | 220-A |
| 120-9 | 220-B |
| 120-17 | 220-C |
| 120-25 | 220-D |

That is to say, each first optical module 110 of the near-end device 10 has a first optical port 120 connected to a second optical port 220 of a relay device 20-1.

In addition, for example, the connection relationship between the first optical port 120 of the first optical module 110 of the near-end device 10 and the second optical port 220 of the second optical module 210 of another relay device 20 (for example, the relay device 20-2) may be shown in Table 2 below.

TABLE 2

| first optical port 120 | second optical port 220 of the relay device 20-2 |
|---|---|
| 120-2 | 220-A |
| 120-10 | 220-B |
| 120-18 | 220-C |
| 120-26 | 220-D |

In this scenario, the number of relay devices 20 that may be connected to the near-end device 10 of the distributed antenna system 100 is equal to the number of first optical ports 120 included in the first optical module 110. For example, in the scenario where the first optical module 110 employs 1*8 first optical ports 120 (that is, each first optical module 110 includes 8 first optical ports 120), the near-end device 10 may be connected with up to 8 relay devices 20.

Similarly, as shown in FIG. 2, for each relay device 20 (for example, the relay device 20-1), the connection relationship between the third optical module 230 (for example, the third optical module 230-K) of the relay device 20 and the fourth optical port 320 of the fourth optical module 310 of the far-end device 30 (for example, the far-end device 30-1) may be shown in Table 3 below.

TABLE 3

| third optical port 240 of the third optical module 230 of the relay device 20-1 | fourth optical port 320 of the far-end device 30-1 |
|---|---|
| 240-1 | 320-K |
| 240-9 | 320-L |
| 240-17 | 320-M |
| 240-25 | 320-N |

That is to say, each third optical module 230 of the relay device 20-1 has a third optical port 240 connected to a fourth optical port 320 of a far-end device 30-1. Therefore, in this scenario, the maximum number of far-end devices 30 that may be connected to each relay device 20 is equal to the number of third optical ports 240 in each third optical module 230.

In addition, for example, the connection relationship between the third optical port 240 of the third optical module 230 of the relay device 20-1 and the fourth optical port 320 of the fourth optical module 310 of another far-end device 30 (for example, the far-end device 30-2) may be shown in Table 4 below.

TABLE 4

| third optical port 240 of the third optical module 230 of the relay device 20-1 | fourth optical port 320 of the far-end device 30-2 |
|---|---|
| 240-2 | 320-K |
| 240-10 | 320-L |
| 240-18 | 320-M |
| 240-26 | 320-N |

In this scenario, the number of far-end devices 30 that may be connected to each relay device 20 of the distributed antenna system 100 is equal to the number of third optical ports 240 included in the third optical module 230. For example, as shown in FIG. 2, in the scenario where the third optical module 230 employs 1*8 third optical ports 240 (that is, each third optical module 230 includes eight third optical ports 240), the relay device 20 may be connected with up to 8 far-end devices 30.

Therefore, in this working mode, a near-end device 10 of the distributed antenna system 100 may be connected with up to the second number of relay devices, and each relay device 20 may be connected with up to the fifth number of far-end devices 30. For example, in the scenario where each first optical module 110 includes 8 optical ports (that is, the second number is 8), and each third optical module 230 includes 8 optical ports (that is, the fifth number is 8), the number ratio among the near-end device 10, the relay device 20, and the far-end device 30 supported by the distribute antenna system 100 may be up to 1:8:64. For another example, when each first optical module 110 includes 8 optical ports (that is, the second number is 8), and each third optical module 230 includes 6 optical ports (that is, the fifth number is 6), the number ratio among the near-end devices 10, relay devices 20, and far-end device 30 supported by the distributed antenna system 100 may be up to 1:8:48.

In the working mode shown in FIG. 2, next level devices of the distributed antenna system 100 may be connected by 4 optical fibers, so 4 radio frequency signals may be transmitted (such as radio frequency signals from a base station to a user's mobile terminal, and vice versa). In the present disclosure, such radio frequency signals are also referred to as communication signals. On the other hand, to detect the optical fiber connection status between the devices at all levels in the system 100, one of the optical fiber connections may be selected to transmit the monitoring signal. For example, as shown in FIG. 2, the connection between the first optical port 120-1 of the first optical module 110 of the near-end device 10 and the second optical port 220-A of the second optical module 210 of the relay device 20 (such as the relay device 20-1) may be selected, to transmit the monitoring signal. Hereinafter, the connection is referred to as the main link A or the first main link. In addition, the connection from the first optical port 120-9 of the first optical module 110 of the near-end device 10 to the second optical port 220-B of the second optical module 210 of the relay device 20-1 may also be selected as a backup link, to transmit the detection signal when the main link A is not connected or disconnected. Hereinafter, the backup link is also referred to as backup link B or the first backup link. Similarly, the connection of the third optical port 240-1 of the third optical module 230 of the relay device 20 (for example, the relay device 20-1) to the fourth optical port 240-1 of the fourth optical module 310 of the far-end device 30 (for example, the far-end device 30-1) may be selected as the main link, namely main link K or the second main link, and the connection of the third optical port 240 of the third optical module 230 of the relay device 20-1 to the fourth optical port 320-L of the fourth optical module 310 of the far-end device 30-1 is used as a backup link, namely the backup link L or the second backup link.

To control each optical module and optical port of each optical module in sending and receiving detection signals, in the distributed optical fiber system 100, each optical port (including each first optical port, second optical port, third optical port, and fourth optical port) are respectively configured with optical switches to enable or disable the sending or receiving of the corresponding optical ports. The optical switch may be an optical receiving switch or an optical emitting switch. The optical receiving switch is used to control whether the corresponding optical port may receive signals, and the optical sending switch is used to control whether the corresponding optical port may send signals. In the present disclosure, an optical receiving switch is used as an example of an optical switch for each optical port. Currently, optical receiving switches are simpler and less costly to implement than optical emitting switches, however, the present disclosure is not limited to this. The detection signal may differ than the communication signal in carrier frequency, so an additional frequency shift keying (FSK) function may be implemented on a conventional optical switch to switch the signal reception and demodulation of the optical port to a different carrier frequency. Therefore, in the present disclosure, the optical switch is also referred to as an FSK switch or an optical switch with FSK function.

In addition, and in some implementations, considering that the detection signal is only transmitted through the main link K or the backup link L, and the far-end device 30 needs to be as small as possible, only one FSK switch may be set in the far-end device 30 to switch between the fourth optical port 320-K and 320-L, to realize the switching between the main link K and the backup link L.

In the present disclosure, the optical fiber connecting the near-end device 10 and the relay device 20 is also called the first optical fiber or the first optical channel, and the optical fiber connecting the relay device 20 and the far-end device 30 is called the second optical fiber or second optical channel. As shown in FIG. 2 and Tables 1 to 4, in this working mode, the first optical port 120 of the near-end device 10 has a predetermined connection relationship with the second optical port 220 of the relay device 20, and the third optical port 240 of the relay device 20 has a predetermined connection relationship with the fourth optical port 320 of the far-end device 30. According to the predetermined connection relationship in this working mode, the first optical channels among the multiple relay devices 20 and respectively connected to one first optical module 110 of the near-end device 10 are also grouped into a group of first optical channels.

Similarly, the second optical channels among the multiple far-end devices 30 and respectively connected to one third optical module 230 of one relay device 20 (such as relay device 20-1) may be grouped into a group of second optical channels.

FIG. 3 shows a schematic diagram of the structure and connection relationship of the distributed antenna system 100 in another working mode according to certain embodiments of the present disclosure. The working mode shown in FIG. 3 is 2T2R (that is, 2 transmissions and 2 receptions) mode, that is, the upper and lower-level devices of the distributed antenna system 100 are respectively connected by two optical fibers to form two physical optical fiber links. Note that the difference between the distributed antenna system 100 shown in FIG. 3 and the distributed antenna system 100 shown in FIG. 2 mainly lies in the difference in the number of optical fibers (for example, optical paths) connecting devices of adjacent levels. Although the relay device 20 is shown in FIG. 3 as including two second optical modules 210, those skilled in the art may understand that the relay device 20 in FIG. 3 may include the same number of second optical modules 210 of the relay device 20 shown in FIG. 2.

In the working mode shown in FIG. 3, adjacent-level devices of the distributed antenna system 100 may be connected through two optical fibers, such that two channels of radio frequency signals, that is, communication signals, may be transmitted. On the other hand, similar to FIG. 2, to detect the optical fiber connection status between devices at all levels in the system 100, one connection may be selected as the main link for transmitting detection signals, and another connection as a backup link for transmitting detection signals. For example, as shown in FIG. 3, the connection between the first optical port 120-1 of the first optical module 110 of the near-end device 10 and the second optical port 220-A of the second optical module 210 of the relay device 20 (such as the relay device 20-1) may be selected as a main link, which is called a main link A or a first main link, and the connection between the third optical port 240-9 of the third optical module 230 of the relay device 20-1 and the fourth optical port 320-L of the fourth optical module 310 of the far-end device 30-1 is used as a backup link, which is called a backup link L or a second backup link.

Figure 4:
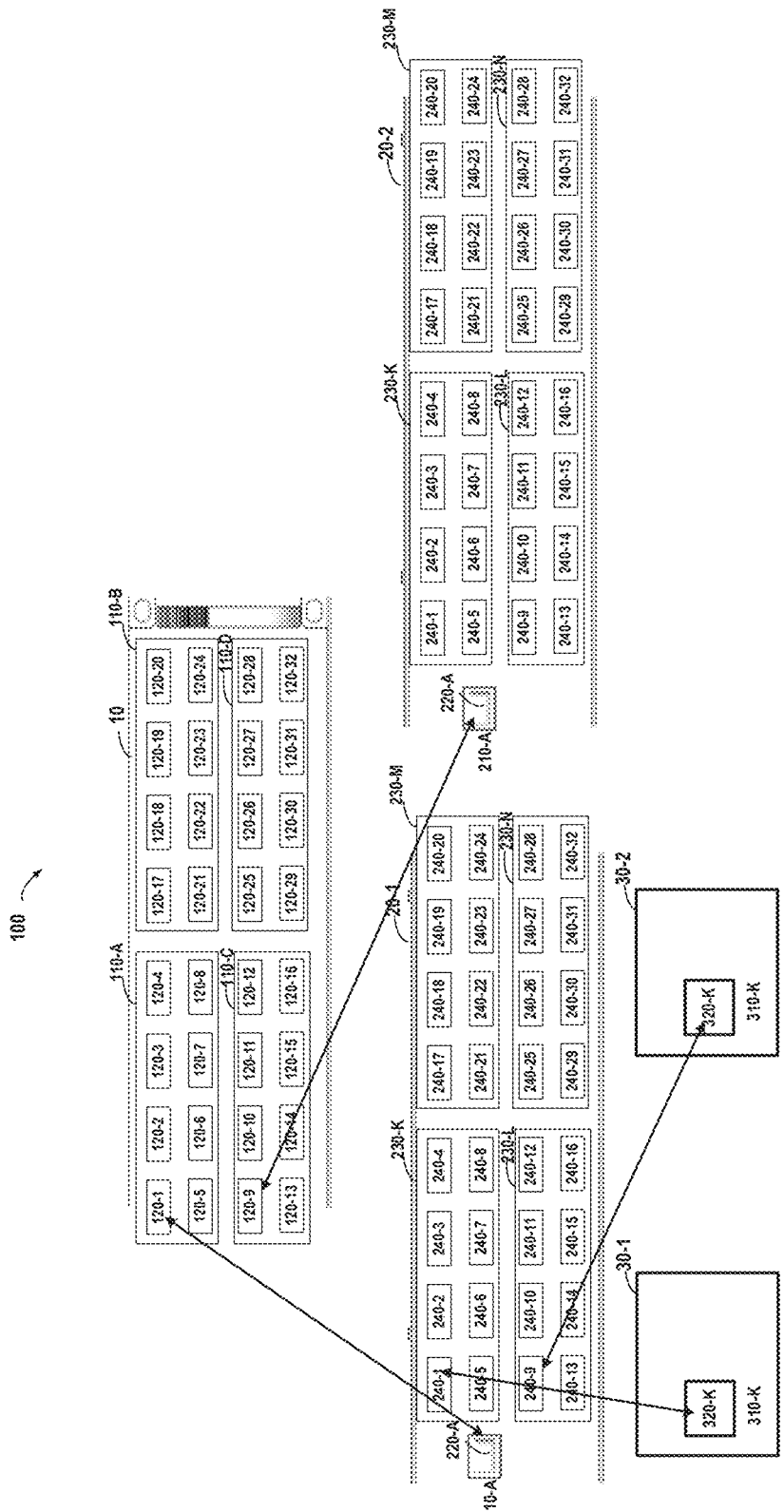
FIG. 4 shows a schematic diagram of the structure and connection relationship of a distributed antenna system in another working mode according to certain embodiments of the present disclosure.

FIG. 4 shows a schematic diagram of the structure and connection relationship of the distributed antenna system 100 in another working mode according to certain embodiments of the present disclosure. The working mode shown in FIG. 4 is 1T1R (that is, 1 transmission and 1 reception) mode, that is, the upper and lower-level devices of the distributed antenna system 100 are connected through one optical fiber to form one physical optical fiber link. In the present disclosure, this working mode is also referred to as single-channel transceiver mode, and the working mode of multiple optical fibers (for example, as shown in FIG. 2 and FIG. 3) is called multi-channel transceiver mode.

In the working mode shown in FIG. 4, the adjacent-level devices of the distributed antenna system 100 are only connected by one optical fiber, such that only one radio frequency signal, that is, the communication signal, may be transmitted. In addition, similar to FIG. 2 and FIG. 3, to detect the status of optical fiber connections between devices at all levels in the system 100, the same link may be used to transmit detection signals. Different from the working mode shown in FIG. 2 and FIG. 3, this single-channel transceiver mode does not have a backup link.

Note that the number of optical modules and/or the number of optical ports of the optical modules in each device shown in FIGS. 2 to 4 are merely exemplary. Depending on implementation requirements or cost considerations, the number of optical modules and/or the number of optical ports of each optical module in different distributed antenna systems 100 may be different. For example, in certain embodiments, each first optical module 110 may have 6 or 4 first optical ports 120, and/or the third optical module 230 may have 6 or 4 third optical ports 240 and the like. In certain embodiments, the same distributed antenna system 100 may work in different working modes with different connection relationships. For example, in the distributed antenna system 100 shown in FIG. 3, the relay device 20 may also include 4 second optical modules 210-A, 210-B, 210-C, and 210-D as shown in FIG. 2. However, when working in 2T2R mode, 2 second optical modules (for example, second optical modules 210-A and 210-B) out of 4 second optical modules 210-A, 210-B, 210-C, and 210D are connected to 2 first optical modules 110 (such as the first optical modules 110-A and 110-B) of the near-end device 10, and the other two second optical modules (such as the second optical modules 210-C and 210-D) are connected to other two first optical modules 110 (such as first optical modules 110-C and 110-D) of the near-end device 10.

Note that the above-mentioned FIGS. 2 to 4 and Tables 1 to 4 exemplarily show that a first optical port of each optical module of the upper-level device is connected to a first lower-level device, and a second optical port is connected to a second lower-level device, that is, connections are respectively made to different lower-level devices in sequence according to the order of the optical ports. However, those skilled in the art may understand that the present disclosure is not limited thereto, and in each working mode, it is fine as long as each optical port of each optical module of the upper-level device and the lower-level equipment are pre-configured with predetermined connection relationship (correspondence relationship).

In addition, FIG. 2 to FIG. 4 only show that the near-end device 10 is connected to two relay devices 20-1 and 20-2 for the purpose of illustration, and one relay device 20 (such as the relay device 20-1) is connected to two far-end devices 30-1 and 30-2. In fact, in the various working modes shown, the near-end device 10 may be connected to more relay devices 20, and one relay device 20 may be connected to more far-end devices 30.

In the distributed antenna system 100, the first carrier frequency may be used to transmit detection signals between the near-end device 10 and the relay device 20, for example, to transmit the first optical switch control command and the first detection message, identification information of the relay device 20 and the like, as described below. The first carrier frequency may be, for example, a 433 MHz carrier frequency. A second carrier frequency different than the first carrier frequency may be used between the relay device 20 and the far-end device 30 to transmit the detection signal, for example, to transmit second optical switch control command, second detection message, and identification information of the far-end device 30 and the like, as described below. The second carrier frequency may be, for example, a 315 MHz carrier frequency. By using the optical fiber link between the near-end device 10 and the relay device 20 (that is, the first optical channel) and the optical fiber link between the relay device 20 and the far-end device 30 (that is, the second optical channel), different carrier frequencies are used to transmit detection signals, which may effectively avoid signal interference between the two optical fiber links.

As mentioned above, due to reasons such as that the near-end device 10, the relay device 20, and the far-end device 30 are usually located at different physical locations, it is difficult to automatically detect the optical fiber connection status of the distributed antenna system 100 in various working modes. For this reason, in the solution according to the present disclosure, corresponding control modules or optic fiber detection apparatus may be configured at each near-end device 10, each relay device 20, and each far-end device 30, or corresponding control modules or optic fiber detection apparatus may be configured at each optical port of each device, such as the control module or optic fiber detection apparatus 1100 described below in conjunction with FIG. 11, to perform the optical fiber detection function described herein. Here, each control module may be a hardware circuit or a chip capable of implementing various operations of the methods 500 and 800 described below in conjunction with FIGS. 5 to 10.

Figure 5:
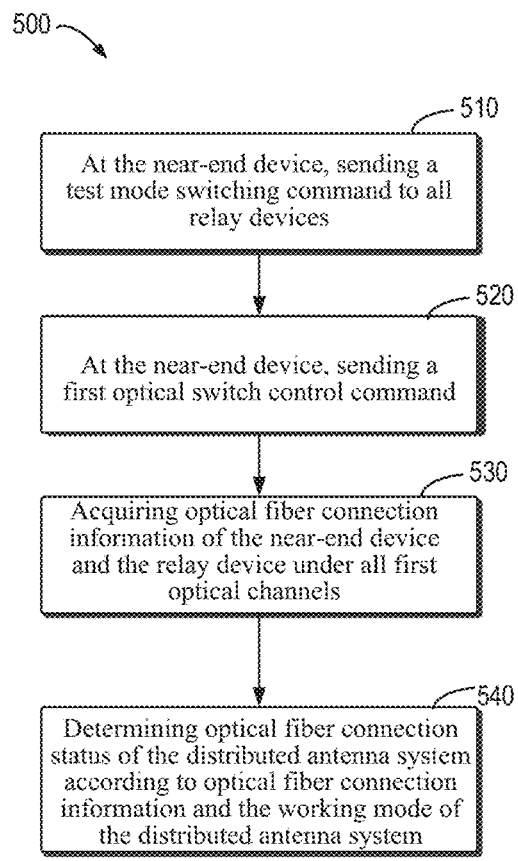
FIG. 5 shows a flowchart of an optical fiber detection method for a distributed antenna system according to certain embodiments of the present disclosure.

FIG. 5 shows a flowchart of an optical fiber detection method 500 for the distributed antenna system 100 according to certain embodiments of the present disclosure. In the optical fiber detection method 500 shown in FIG. 5, description is made in view of the working mode shown in FIG. 2 taken as an example, but those skilled in the art may understand that the present disclosure is not limited thereto. The optical fiber detection method 500 described in conjunction with FIG. 5 may be applied to various working modes. The optical fiber detection method 500 may be used to detect the optical fiber connection status between adjacent-level devices of the distributed antenna system 100 (such as the connection between the near-end device 10 and the relay device 20).

As shown in FIG. 5, at block 510, the near-end device 10 sends a test mode switch command to relay devices 20 to order the relay devices 20 to switch to the test mode. In some embodiments, the test mode switch command is sent to all relay devices.

At block 520, in the test mode, the near-end device 10 may send a first optical switch control command. The first optical switch control command is used to instruct the relay devices 20 receiving the first optical switch control command to switch to a group of first optical channels. For example, the first optical switch control command may instruct these relay devices 20 to switch to a group of first optical channels A. In this scenario, the near-end device 10 may measure the connection between the first optical port 120-1 of the near-end device 10 and the second optical port 220-A of the relay device 20-1, and the connection between the first optical port 120-2 of the near-end device 10 and the second optical port 220-A of the relay device 20-2, and the like.

At each relay device 20, if the first optical switch control command of the near-end device 10 is received, the relay device 20 may determine whether the alarm status of the second optical module 210, which corresponds to first optical channel(s) in the group of first optical channels, is normal. If it is determined that the alarm state of the second optical module 210 corresponding to the first optical channel is normal, that is, it is determined that the first optical channel is connected normally, then the relay device 20 turns on the optical switch of the second optical module 210 and turns off the optical switches of other second optical modules 210 for a switch to the first optical channel. On the contrary, if it is determined that the alarm state of the second optical module 210 corresponding to the first optical channel is abnormal, the relay device 20 does not switch to the first optical channel. In this way, it is possible to prevent the relay device 20 from switching to the optical channel where the optical fiber connection fails.

At block 530, the near-end device 10 acquires the optical fiber connection information of the near-end device 10 and the relay device 20 under all first optical channels of the group of first optical channels.

Figure 6:
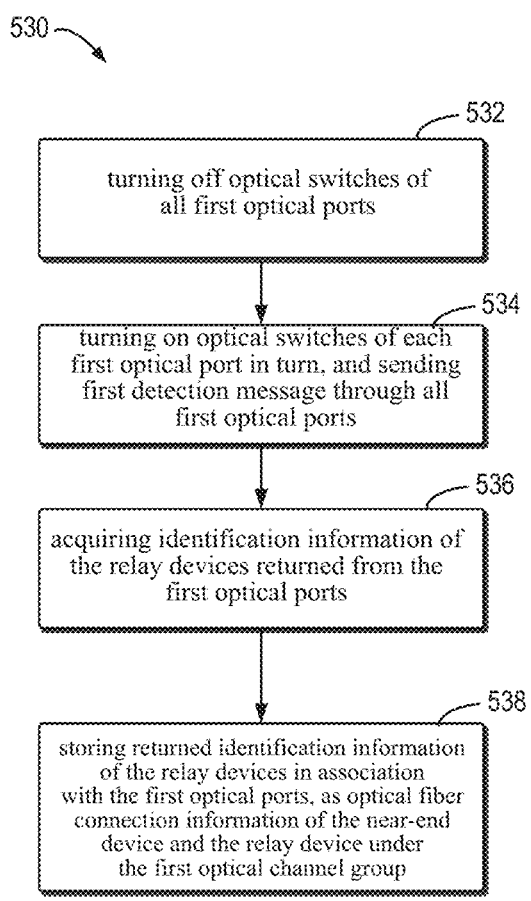
FIG. 6 shows a further flowchart of a block for obtaining optic fiber connection information according to certain embodiments of the present disclosure.

FIG. 6 shows a flowchart of obtaining optical fiber connection information, further to block 530, according to certain embodiments of the present disclosure.

As shown in FIG. 6, and at block 532, the near-end device 10 may turn off the optical switches of all first optical ports 120, and then turn on the optical switch of each first optical port 120 in turn at block 534, and send the first detection message through the first optical port 120. Here, the first detection message is used to instruct the relay device 20 receiving the first detection message to send the identification information of the relay device 20 to the near-end device 10.

In certain embodiments, the near-end device 10 does not send the first detection message at each first optical port 120, but only sends the first detection message at the first optical port 120 whose alarm state is normal.

Specifically, the near-end device 10 may determine whether the alarm state of a first optical port 120 is normal; if it is determined that the alarm state of the first optical port 120 is abnormal, this first optical port 120 is skipped; and if the alarm status of the first optical port 120 is normal, then the first detection message is sent through the first optical port 120.

In certain other embodiments, the block 534 may not be executed one by one for the first optical ports 120, but rather all the first optical ports 120 are divided into multiple first optical port groups according to the working mode of the distributed antenna system 100, and then the optical switch of each first optical port group are turned on in turn, and the first detection message is sent through the each first optical port group. In certain embodiments, the first optical ports 120 connected to the same relay device 20 may be grouped into a first optical port group according to the working mode of the distributed antenna system 100. For example, in the 4T4R working mode shown in FIG. 2 and Table 1 to Table 4, the first optical ports 120-1, 120-9, 120-17 and 120-25 connected to the relay device 20-1 may be grouped into a first optical port group, and the first optical ports 120-2, 120-10, 120-18 and 120-26 connected to the relay device 20-2 may be grouped into another first optical port group.

The relay device 20 that has received the first detection message may send its identification information to the near-end device 10 through the corresponding first optical channel. In the event of sending the first detection message through the first optical port group, each relay device 20 that has received the first detection message may send its own identification information through the group of first optical channels corresponding to the first optical port group.

At block 536, the near-end device 10 may acquire the identification information of the relay devices 20 returned from the first optical ports 120.

At block 538, the near-end device 10 may store the returned identification information of the relay devices 20 in association with the first optical ports 120, as the optical fiber connection information of the near-end device 10 and the relay devices 20 under the first optical channel group.

Continuing with FIG. 5, at block 540, the near-end device 10 determines the optical fiber connection status of the distributed antenna system 100, according to the optical fiber connection information of the near-end device 10 and the relay device 20 under all first optical channels and the working mode of the distributed antenna system 100.

Figure 7:
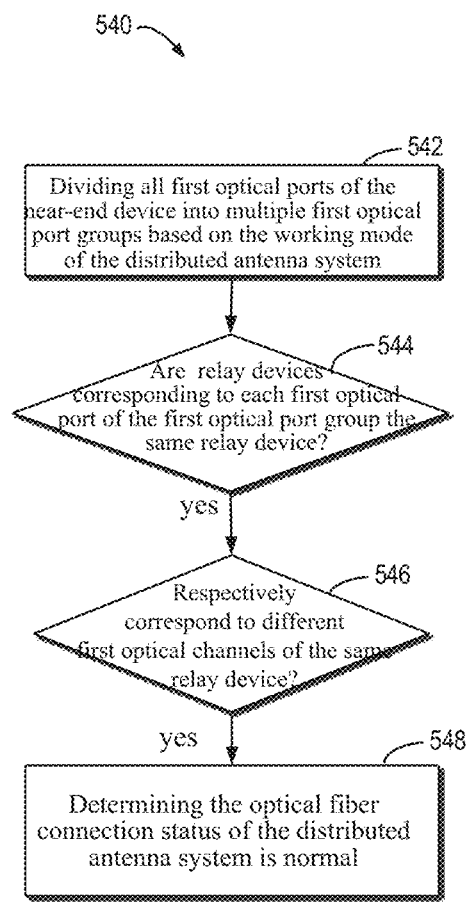
FIG. 7 shows a further flow chart of a block for obtaining optic fiber connection status according to certain embodiments of the present disclosure.

FIG. 7 shows a flowchart of obtaining the optical fiber connection status, further to block 540, according to certain embodiments of the present disclosure.

As shown in FIG. 7, at block 542, the near-end device 10 may divide all first optical ports 120 of the near-end device 10 into multiple first optical port groups based on the working mode of the distributed antenna system 100. In certain embodiments, the first optical ports 120 connected to the same relay device 20 may be grouped into a first optical port group based on the working mode of the distributed antenna system 100. For example, in the 4T4R working mode shown in FIG. 2 and Table 1 to Table 4, the first optical ports 120-1, 120-9, 120-17 and 120-25 connected to the relay device 20-1 may be grouped into a first optical port group, and the first optical ports 120-2, 120-10, 120-18 and 120-26 connected to the relay device 20-2 may be grouped into another first optical port group.

At block 544, the near-end device 10 may determine whether relay devices corresponding to each first optical port of the first optical port group are the same relay device, according to the optical fiber connection information of the near-end device 10 and the relay device 20 under all first optical channels.

As mentioned above, at block 530, the near-end device 10 may acquire the optical fiber connection information of the near-end device 10 and the relay device 20 under all first optical channels. The optical fiber connection information may include the correspondence between each first optical port 120 of the near-end device 10 and the identification information of each relay device 20. Therefore, at block 544, the near-end device may determine the identification information of the relay device 20 corresponding to each first optical port 120 according to the optical fiber connection information, and further determine whether all the first optical ports in the first optical port group correspond to the same relay device according to the first optical port group determined at block 542. For example, as mentioned above, it is assumed that for the first optical port group composed of the first optical ports 120-1, 120-9, 120-17, and 120-25, the relay devices corresponding to these first optical ports are the relay device 20-1, it may then be determined that all first optical ports in the first optical port group correspond to the same relay device. Conversely, it may be determined that the relay device corresponding to the first optical port in the first optical port group is not the same relay device.

If it is determined that the relay device corresponding to the first optical port 120 in a first optical port group is the same relay device, then at block 546, the near-end device 10 may further determine whether the first optical ports in the first optical port group respectively correspond to different first optical channels of the same relay device. For example, if it is determined at block 544 that the first optical ports 120-1, 120-9, 120-17, and 120-25 all correspond to the relay device 20-1, at block 546, the near-end device 10 may further determine whether the first optical ports 120-1, 120-9, 120-17, and 120-25 respectively correspond to different first optical channels of the relay device 20-1, for example, whether they respectively correspond to each first optical channel of the relay device 20-1, namely optical channel A, B, C and D.

If it is determined that the first optical ports in the first optical port group correspond to different first optical channels of the same relay device, then at block 548, the near-end device 10 may determine the optical fiber connection status of the distributed antenna system 100 is normal.

On the other hand, if it is determined at block 544 that the relay devices corresponding to the first optical port in the first optical port group are not the same relay device or it is determined at block 546 that the first optical ports in the first optical port group do not respectively correspond to different first optical channels of the same relay device, the near-end device 10 may determine that the optical fiber connection status of the distributed antenna system 100 is abnormal (not shown in the figure).

By using the optical fiber detection method 500 described above, the near-end device 10 may determine whether the optical fiber connection status of the distributed antenna system 100 is normal, more specifically, whether the connection status between the near-end device 10 and the relay device 20 is normal.

In certain other embodiments, each relay device 20 may also determine whether its connection status with the corresponding far-end device 30 is normal in a manner similar to the method 500 described above.

Figure 8:
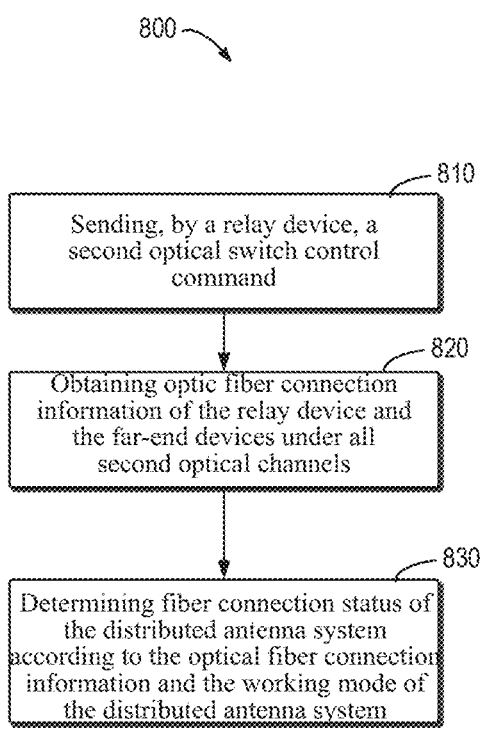
FIG. 8 shows a flowchart of an optical fiber detection method for a distributed antenna system according to certain other embodiments of the present disclosure.

FIG. 8 shows a flowchart of an optical fiber detection method 800 for the distributed antenna system 100 according to certain other embodiments of the present disclosure. In the optical fiber detection method 800 shown in FIG. 8, description is made in view of the working mode shown in FIG. 2. However, those skilled in the art may understand that the present disclosure is not limited thereto, and the optical fiber detection method 800 described in conjunction with FIG. 8 may be applied to various working modes. The optical fiber detection method 800 may be used to detect the optical fiber connection status between adjacent-level devices of the distributed antenna system 100 (such as between the relay device 20 and the far-end device 30). The optical fiber detection method 800 may be integrated with the optical fiber detection method 500 to detect the optical fiber connection status of the entire distributed antenna system 100, and may also be implemented separately to realize the detection of a portion of the optical fiber connection status of the distributed antenna system 100.

As shown in FIG. 8, and at block 810, a relay device 20 (for example, relay device 20-1) may send a second optical switch control command to all far-end devices 30 connected to it. The second optical switch control command is used to command all far-end devices 30 to switch to a group of second optical channels. For example, the second optical switch control command may instruct all far-end devices 30 to switch to a group of second optical channels K. In this scenario, the relay device 20-1 may measure the connection between the third optical port 240-1 of the relay device 20 and the fourth optical port 320-K of the far-end device 30-1, and the connection between the third optical port 240-2 of the relay device 20-1 and the fourth optical port 320-K of the far-end device 30-2.

At each far-end device 30, if the second optical switch control command of the relay device 20-1 is received, the far-end device 30 may determine whether the alarm status of the fourth optical module 310 corresponding to second optical channel(s) in the group of second optical channels is normal. If it is determined that the alarm state of the fourth optical module 310 corresponding to the second optical channel is normal, that is, it is determined that the connection of the second optical channel is normal, then the far-end device 30 turns on the optical switch of the fourth optical module 310 and turns off the optical switches of other fourth optical modules 310 for a switch to the second optical channel. On the contrary, if it is determined that the alarm state of the fourth optical module 310 corresponding to the second optical channel is abnormal, the far-end device 30 does not switch to the second optical channel. In this way, it is possible to prevent the far-end device 30 from switching to the optical channel where the optical fiber connection fails.

At block 820, the relay device 20-1 obtains the optic fiber connection information of the relay device 20-1 and the far-end devices 30 under all second optical channels of the group of second optical channels.

Figure 9:
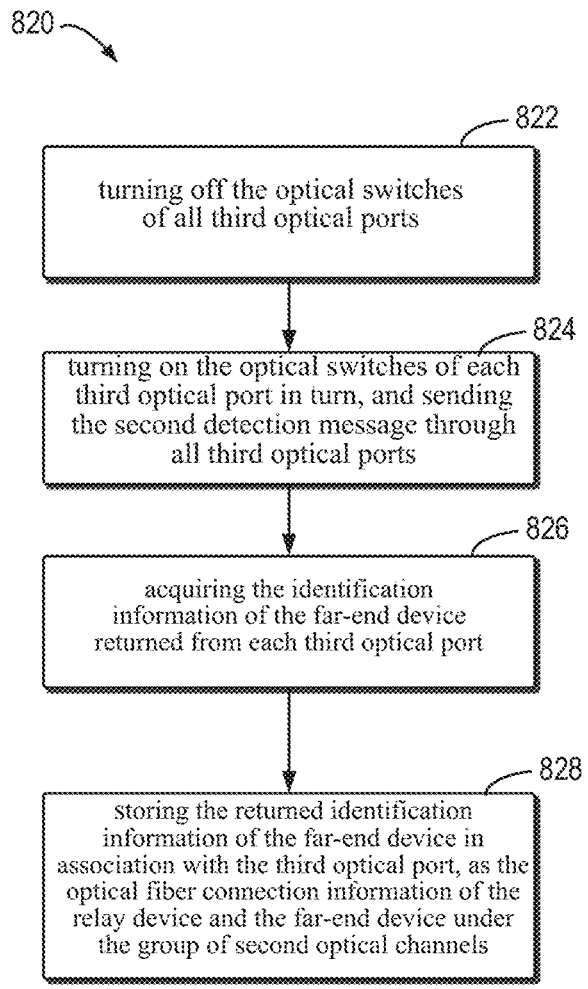
FIG. 9 shows a further flowchart of a block for acquiring optic fiber connection information according to certain embodiments of the present disclosure.

FIG. 9 shows a flowchart of obtaining optic fiber connection information, further to block 820, according to certain embodiments of the present disclosure.

As shown in FIG. 9, and at block 822, the relay device 20-1 may turn off the optical switches of all third optical ports 240, and then at block 824 turn on the optical switch of each third optical port 240 in turn, and send the second detection message through the third optical port 240. Here, the second detection message is used to instruct the far-end device 30 which has received the second detection message to send the identification information of the far-end device 30 to the relay device 20-1.

In certain embodiments, the relay device 20-1 does not send the second detection message at each third optical port 240, but only sends the second detection message at the third optical port 240 whose alarm state is normal.

Specifically, the relay device 20-1 may determine whether the alarm state of a third optical port 240 is normal; if it is determined that the alarm state of the third optical port 240 is abnormal, the third optical port 240 is skipped; and if it is determined that the alarm state of the third optical port 240 is normal, then the second detection message is sent through the third optical port 240.

In certain other embodiments, the block 824 may not be executed one by one for the third optical ports 240, but rather all the third optical ports 240 are divided into multiple third optical port groups according to the working mode of the distributed antenna system 100, and then the optical switch of each third optical port group is turned on in turn, and the third detection message is sent through the third optical port group. In certain embodiments, the third optical ports 240 connected to the same far-end device 30 may be grouped into a third optical port group according to the working mode of the distributed antenna system 100. For example, in the 4T4R working mode shown in FIG. 2 and Table 1 to Table 4, the third optical ports 240-1, 240-9, 240-17 and 240-25 connected to the far-end device 30-1 may be grouped into a third optical port group, the third optical ports 240-2, 240-10, 240-18 and 240-26 connected to the far-end device 30-2 may be grouped into another third optical port group.

The far-end device 30 that has received the second detection message may send its identification information to the relay device 20-1 through the corresponding second optical channel. While sending the second detection message through the third optical port group, each far-end device 30 that has received the second detection message may send its own identification information through the group of second optical channels corresponding to the third optical port group.

At block 826, the relay device 20-1 may acquire the identification information of the far-end devices 30 returned from the third optical ports 240.

At block 828, the relay device 20-1 may store the returned identification information of the far-end devices 30 in association with the third optical ports 240, as the optical fiber connection information of the relay device 20-1 and the far-end devices 30 under the group of second optical channels.

In some scenarios, as mentioned above, only one FSK switch is set in the far-end device 30 to switch between the fourth optical ports 320-K and 320-L, to realize the switch between the main link K and backup link L. In this scenario, for the 4T4R working mode shown in FIG. 2, since the fourth optical ports 320-M and 320-N may not perform optical receiving control through the FSK switch, it is difficult to determine the optical fiber connection information between the fourth optical ports 320-M and 320-N and the third optical port 240 of the relay device 20. For this reason, and in certain embodiments, the far-end device 30 may turn off the digital-to-analog converters of the fourth optical ports 320 (such as the fourth optical ports 320-M and 320-N) that are not configured with FSK switches, so that the light emitting power of these fourth optical ports 320 becomes very low. At this time, the third optical ports 240 on the relay device 20 and connected to the fourth optical ports will generate an optical receiving alarm signal. In this way, the optical fiber connection information between the fourth optical port 320 not configured with an FSK switch and the third optical port 240 of the relay device 20 may be determined.

Continuing with FIG. 8, and at block 830, the relay device 20-1 based on the optical fiber connection information of the relay device 20-1 and the far-end device 30 under all second optical channels and the working mode of the distributed antenna system 100, determining fiber connection status of distributed antenna system 100.

Figure 10:
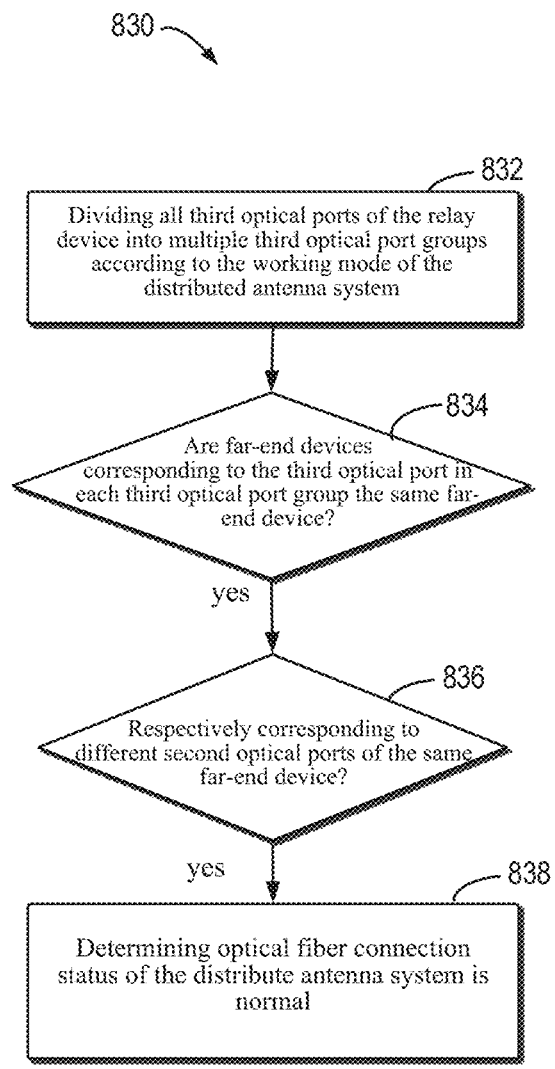
FIG. 10 shows a further flow chart of a block for acquiring optic fiber connection status according to certain embodiments of the present disclosure.

FIG. 10 shows a flowchart of obtaining optical fiber connection status, further to block 830, according to certain embodiments of the present disclosure.

As shown in FIG. 10, at block 832, the relay device 20-1 may divide all third optical ports 240 of the relay device 20-1 into multiple third optical port groups according to the working mode of the distributed antenna system 100. In certain embodiments, the third optical ports 240 connected to the same far-end device 30 may be grouped into a third optical port group according to the working mode of the distributed antenna system 100. For example, in the 4T4R working mode shown in FIG. 2 and Table 1 to Table 4, the third optical ports 240-1, 240-9, 240-17 and 240-25 connected to the far-end device 30-1 grouped into a third optical port group, and the third optical ports 240-2, 240-10, 240-18 and 240-26 connected to the far-end device 30-2 may be grouped into another third optical port group.

At block 834, the relay device 20-1 may determine whether far-end devices corresponding to the third optical port in each third optical port group are the same far-end device, according to the optical fiber connection information of the relay device 20-1 and the far-end device 30 under all second optical channels.

As mentioned above, at block 820, the relay device 20-1 may acquire the optic fiber connection information of the relay device 20-1 and the far-end device 30 under all second optical channels. The optical fiber connection information may include the correspondence between each third optical port 240 of the relay device 20-1 and the identification information of each far-end device 30. Therefore, at block 824, the relay device 20-1 may determine the identification information of the far-end device 30 corresponding to each third optical port 240 according to the fiber connection information, and determine whether all the third optical ports in the third optical port group correspond to the same far-end device, according to the third optical port group determined at block 832. For example, as mentioned above, assuming for the third optical port group composed of the third optical ports 240-1, 240-9, 240-17, and 240-25, the far-end devices corresponding to these third optical ports are the far-end device 30-1, it may be determined that all the third optical ports in the third optical port group correspond to the same far-end device. Conversely, it may be determined that the far-end device corresponding to the third optical port in the third optical port group is not the same far-end device.

If it is determined that the far-end device corresponding to the third optical port 240 in a third optical port group is the same far-end device, then at block 836, the relay device 20-1 may further determine whether the third optical ports in the third optical port group respectively correspond to different second optical channels. For example, assuming that it is determined at block 834 that the third optical ports 240-1, 240-9, 240-17, and 240-25 all correspond to the far-end device 30-1, then at block 836, the relay device 20-1 may further determine whether these third optical ports 240-1, 240-9, 240-17, and 240-25 respectively correspond to different second optical channels of the far-end device 30-1, for example, whether they respectively correspond to the second optical channels K, L, M and N of the far-end device 30-1.

If it is determined that the third optical ports in the third optical port group respectively correspond to different second optical channels of the same far-end device, then at block 838, the relay device 20-1 may determine that the optical fiber connection status of the distributed antenna system 100 is normal.

On the other hand, if it is determined at block 834 that the far-end devices corresponding to the third optical ports in a third optical port group are not the same far-end device or it is determined at block 836 that the third optical ports in the third optical port group do not respectively correspond to different second optical channels of the same far-end device, the relay device 20-1 may determine that the optical fiber connection status of the distributed antenna system 100 is abnormal (not shown in the figure).

In addition, after the execution of method 500 and/or method 800 is completed, the distributed antenna system 100 (for example, each control module 1100 therein) may automatically refresh the topology map of the distributed antenna system by turning on all optical switches, and display it on the web side, so that the operation and maintenance personnel may easily detect the optic fiber connection status.

Figure 11:
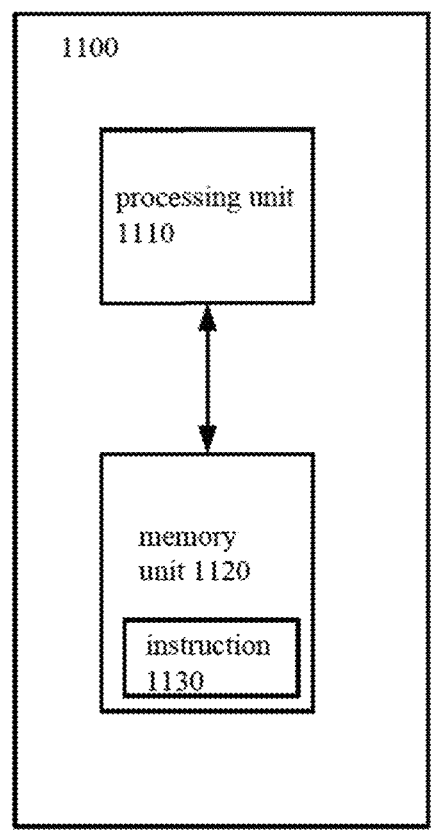
FIG. 11 shows a schematic structural diagram of an optic fiber detection apparatus according to certain embodiments of the present disclosure.

FIG. 11 shows a schematic structural diagram of an optic fiber detection apparatus 1100 according to certain embodiments of the present disclosure. The optic fiber detection apparatus 1100 may be a control module implemented in any one of the near-end device 10, the relay device 20, and the far-end device 30.

As shown in FIG. 11, the optic fiber detection apparatus 1100 may include one or more processing units 1110. The processing unit 1110 controls operations and functions of the optic fiber detection apparatus 1100. For example, in certain embodiments, processing unit 1110 may perform various operations with help of instruction 1130 stored in one or more memory units 1120 coupled to the processing unit 1110. Memory unit 1120 may be of any suitable type suitable for the local technical environment and may be implemented using any suitable data storage technology, including but not limited to semiconductor-based storage devices, magnetic storage devices and systems, and optical storage devices and systems. Although only one processing unit 1110 and one memory unit 1120 are shown in FIG. 11, there may be more physically different processing units 1110 and memory units 1120 in the optic fiber detection apparatus 1100.

The processing unit 1110 may be of any suitable type suitable for the local technical environment, and may include, but is not limited to, a microprocessor, a digital signal processor (DSP), a field programmable gate array (FPGA), and the like.

When the optic fiber detection apparatus 1100 is used to implement the scheme according to the present disclosure, the processing unit 1110 may be configured (for example, configured by the instruction 1130 in the memory unit 1120) to realize at least one of the above-described methods or steps with reference to FIG. 5 to FIG. 10. All the features described above with reference to FIG. 5 to FIG. 10 are applicable to the optic fiber detection apparatus 1100 and will not be repeated here.

Those skilled in the art may understand that the method steps described herein are not merely limited to the order shown in the accompanying drawings, but rather maybe executed in any other feasible order.

In one or more exemplary designs, the functions described in the present disclosure may be implemented by hardware, software, firmware, or any combination thereof. For example, if implemented in software, the functions may be stored on a computer-readable medium as one or more instructions or codes, or may be transmitted as one or more instructions or codes on the computer-readable medium.

Each component of the interconnection device disclosed herein may be implemented using discrete hardware components, or may be integrated on one hardware component. For example, a general purpose processor, digital signal processor (DSP), application specific integrated circuit (ASIC), field programmable gate array (FPGA) or other programmable logic device, discrete gate or transistor logic, discrete hardware components or any combinations thereof to execute the functions described in the present disclosure, to implement or perform the various exemplary logical blocks, modules, and circuits in connection with the present disclosure.

Those skilled in the art should also understand that the various exemplary logic blocks, modules, circuits and algorithm steps described in conjunction with the embodiments of the present disclosure may be implemented as electronic hardware, computer software, or a combination of the two.

The above description of the present disclosure is provided to enable any person skilled in the art to make or use the present disclosure. Various modifications to the present disclosure will be readily apparent to those skilled in the art, and the generic principles defined herein may be applied to other modifications without departing from the spirit and scope of the present disclosure. Thus, the disclosure is not to be limited to the examples and designs described herein but is to be accorded the widest scope consistent with the principles and novel features disclosed herein.

What is claimed is:

1. An optic fiber detection method of a distributed antenna system, wherein the distributed antenna system includes a near-end device, a plurality of relay devices, and a plurality of far-end devices, the near-end device is connected to the plurality of relay devices through multiple groups of first optic channels, each of the relay devices is connected to the plurality of far-end devices through multiple groups of second optical channels, and the optical fiber detection method comprises:
   at the near-end device, sending a test mode switch command to the plurality of relay devices to command the plurality of relay devices to switch to a test mode; and
   under the test mode:
      sending a first optical switch control command, the first optical switch control command being used to instruct the plurality of relay devices that have received the first optical switch control command to switch to a group of first optical channels;
      acquiring optic fiber connection information between the near-end device and the plurality of relay devices under all first optical channels of the group of first optical channels; and
      determining optic fiber connection status of the distributed antenna system according to the optic fiber connection information between the near-end device and the plurality of relay devices under the all first optical channels and a working mode of the distributed antenna system.

2. The optical fiber detection method according to claim 1, wherein obtaining the optical fiber connection information between the near-end device and the plurality of relay devices under the all first optical channels comprises:
   turning off optical switches of all first optical ports;
   turning on an optical switch of each first optical port in turn, and sending a first detection message through the first optical port;
   acquiring identification information of the plurality of relay devices returned from the first optical ports; and
   storing the returned identification information of the plurality of relay devices in association with the first optical ports as the optic fiber connection information between the near-end device and the plurality of relay devices under the group of first optical channels.

3. The optical fiber detection method according to claim 2, wherein turning on the optical switch of the each first optical port in turn, and sending the first detection message through the first optical port comprises:
   determining whether an alarm state of the each first optical port is normal;
   skipping the first optical port in response to determining that the alarm state of the first optical port is abnormal; and
   in response to determining that the alarm state of the first optical port is normal, sending the first detection message through the first optical port.

4. The optical fiber detection method according to claim 2, wherein turning on the optical switch of the each first optical port in turn, and sending the first detection message through the first optical port comprises:

dividing all the first optical ports of the near-end device into multiple first optical port groups based on the working mode of the distributed antenna system; and turning on an optical switch of each first optical port group in turn, and sending the first detection message through the first optical port group.

5. The optical fiber detection method according to claim 1, wherein determining the optical fiber connection status of the distributed antenna system comprises:

dividing all first optical ports of the near-end device into multiple first optical port groups based on the working mode of the distributed antenna system;

determining whether relay devices corresponding to first optical ports in each first optical port group is a same relay device based on the optical fiber connection information of the near-end device and the relay device under all first optical channels;

in response to determining that the relay device corresponding to the first optical ports in a first optical port group are the same relay device, determine whether the first optical ports in the first optical port group respectively correspond to different first optical channels of the same relay device; and in response to determining that the first optical ports in the first optical port group respectively correspond to different first optical channels of the same relay device, determining that the optical fiber connection status of the distributed antenna system is normal.

6. The optical fiber detection method according to claim 5, further comprising:

in response to determining that the relay devices corresponding to the first optical ports in a first optical port group are not the same relay device or in response to determining that the first optical ports in the first optical port group are not respectively corresponding to different first optical channels of the same relay device, determining that the optical fiber connection status of the distributed antenna system is abnormal.

7. The optical fiber detection method according to claim 1, further comprising, at each relay device:

in response to receiving a first optical switch control command from the near-end device, determining whether an alarm status of a second optical module corresponding to one first optical channel in the group of first optical channels is normal;

in response to determining that the alarm state of the second optical module corresponding to the first optical channel is normal, turning on an optical switch of the second optical module and turning off optical switches of other second optical modules, to switch to the first optical channel; and in response to determining that the alarm state of the second optical module corresponding to the first optical channel is abnormal, determining not to switch to the first optical channel.

8. The optical fiber detection method according to claim 1, further comprising, at each relay device:

sending a second optical switch control command to all far-end devices connected to the relay device, where the second optical switch control command is used to instruct all far-end devices to switch to a group of second optical channels;

obtaining optical fiber connection information between the relay device and the far-end devices under all second optical channels of the group of second optical channels; and determining the optical fiber connection status of the distributed antenna system according to the fiber connection information between the relay device and the far-end devices under all second optical channels and the working mode of the distributed antenna system.

9. The optical fiber detection method according to claim 8, wherein obtaining the optical fiber connection information between the relay device and the far-end devices under all second optical channels comprises:

turning off optical switches of all third optical ports;

turning on an optical switch of each third optical port in turn, and sending a second detection message through the third optical port;

obtaining identification information of the far-end devices returned from the third optical ports; and storing the returned identification information of the far-end devices in association with the third optical ports as the optical fiber connection information between the relay device and the far-end devices under the group of second optical channels.

10. The optical fiber detection method according to claim 9, wherein turning on the optical switch of each third optical port in turn, and sending the second detection message through the third optical port comprises:

determining whether an alarm status of each third optical port is normal;

skipping the third optical port in response to determining that the alarm state of the third optical port is abnormal; and in response to determining that the alarm state of the third optical port is normal, sending the second detection message through the third optical port.

11. The optical fiber detection method according to claim 9, wherein turning on the optical switch of each third optical port in turn, and sending the second detection message through the third optical port comprises:

dividing all the third optical ports of the relay device into multiple third optical port groups according to the working mode of the distributed antenna system; and turning on optical switches of each third optical port group in turn, and sending the second detection message through the third optical port group.

12. The optical fiber detection method according to claim 8, wherein obtaining the optical fiber connection information between the relay device and the far-end device under all second optical channels comprises:

in response to determining that only one frequency shift keying (FSK) switch is set in the far-end device to switch between two fourth optical ports of the far-end device, detecting the optical receiving alarm signal of the third optical port of the relay device to determine optical fiber connection information between a fourth optical port of the far-end device not configured with an FSK switch and a third optical port of the relay device, wherein a digital-to-analog converter of the fourth optical port of the far-end device not configured with the FSK switch is turned off.

13. The optical fiber detection method according to claim 8, wherein determining the optical fiber connection status of the distributed antenna system comprises:

dividing all third optical ports of the relay device into multiple third optical port groups according to the working mode of the distributed antenna system;

determining whether far-end devices corresponding to the third optical ports in each third optical port group are the same far-end device according to the optical fiber connection information between the relay device and the far-end device under all second optical channels;

in response to determining that the far-end devices corresponding to the third optical ports in a third optical port group are the same far-end device, determining whether the third optical ports in the third optical port group respectively correspond to different second optical channels of the same far-end device; and in response to determining that the third optical ports in the third optical port group respectively correspond to different second optical channels of the same far-end device, determining that the optical fiber connection status of the distributed antenna system is normal.

14. The optical fiber inspection method according to claim 13, further comprising:

in response to determining that the far-end devices corresponding to the third optical ports in a third optical port group are not the same far-end device or in response to determining that the third optical ports in the third optical port group are not respectively corresponding to the different second optical channels of the same far-end device, determining that the optical fiber connection status of the distributed antenna system is abnormal.

15. The optical fiber inspection method according to claim 8, further comprising, at each far-end device:

in response to receiving a second optical switch control command from the relay device, determining whether an alarm status of the fourth optical module corresponding to one second optical channel in the group of second optical channels is normal;

in response to determining that the alarm state of the fourth optical module corresponding to the second optical channel is normal, turning on the optical switch of the fourth optical module and turning off the optical switches of other fourth optical modules, to switch to the second optical channel; and in response to determining that the alarm state of the fourth optical module corresponding to the second optical channel is abnormal, determining not to switch to the second optical channel.

16. The optical fiber detection method according to claim 1, further comprising:

after the optical fiber connection status of the distributed antenna system is determined, turning on all optical switches to update a topology map of the distributed antenna system.

17. The optical fiber detection method as claimed in claim 1, wherein the first optical channel uses a first carrier frequency, and the second optical channel uses a second carrier frequency different than the first carrier frequency.

18. An optic fiber detection apparatus, comprising:

at least one processor; and at least one memory coupled to the at least one processor and storing instructions for execution by the at least one processor that, when executed by the at least one processor, cause the at least one processor to perform:

at a near-end device, sending a test mode switch command to a plurality of relay devices to command the plurality of relay devices to switch to a test mode, wherein a distributed antenna system includes the near-end device, the plurality of relay device, and the plurality of far-end devices, the near-end device is connected to the plurality of relay devices through multiple groups of first optic channels, each of the relay devices is connected to the plurality of far-end devices through multiple groups of second optical channels; and under the test mode:

sending a first optical switch control command, the first optical switch control command being used to instruct the plurality of relay devices that have received the first optical switch control command to switch to a group of first optical channels;

acquiring optic fiber connection information between the near-end device and the plurality of relay devices under all first optical channels of the group of first optical channels; and determining optic fiber connection status of the distributed antenna system according to the optic fiber connection information between the near-end device and the plurality of relay devices under the all first optical channels and a working mode of the distributed antenna system.

19. A non-transitory computer-readable storage medium on which computer program code is stored, and the computer program code, when executed by a processor, cause the processor to perform:

at a near-end device, sending a test mode switch command to a plurality of relay devices to command the plurality of relay devices to switch to a test mode, wherein a distributed antenna system includes the near-end device, the plurality of relay device, and the plurality of far-end devices, the near-end device is connected to the plurality of relay devices through multiple groups of first optic channels, each of the relay devices is connected to the plurality of far-end devices through multiple groups of second optical channels; and under the test mode:

sending a first optical switch control command, the first optical switch control command being used to instruct the plurality of relay devices that have received the first optical switch control command to switch to a group of first optical channels;

acquiring optic fiber connection information between the near-end device and the plurality of relay devices under all first optical channels of the group of first optical channels; and determining optic fiber connection status of the distributed antenna system according to the optic fiber connection information between the near-end device and the plurality of relay devices under the all first optical channels and a working mode of the distributed antenna system.

* * * * *